June 30, 1936.  C. E. EVERETT  2,045,763
HAY LOADER
Filed Oct. 25, 1935  4 Sheets-Sheet 1
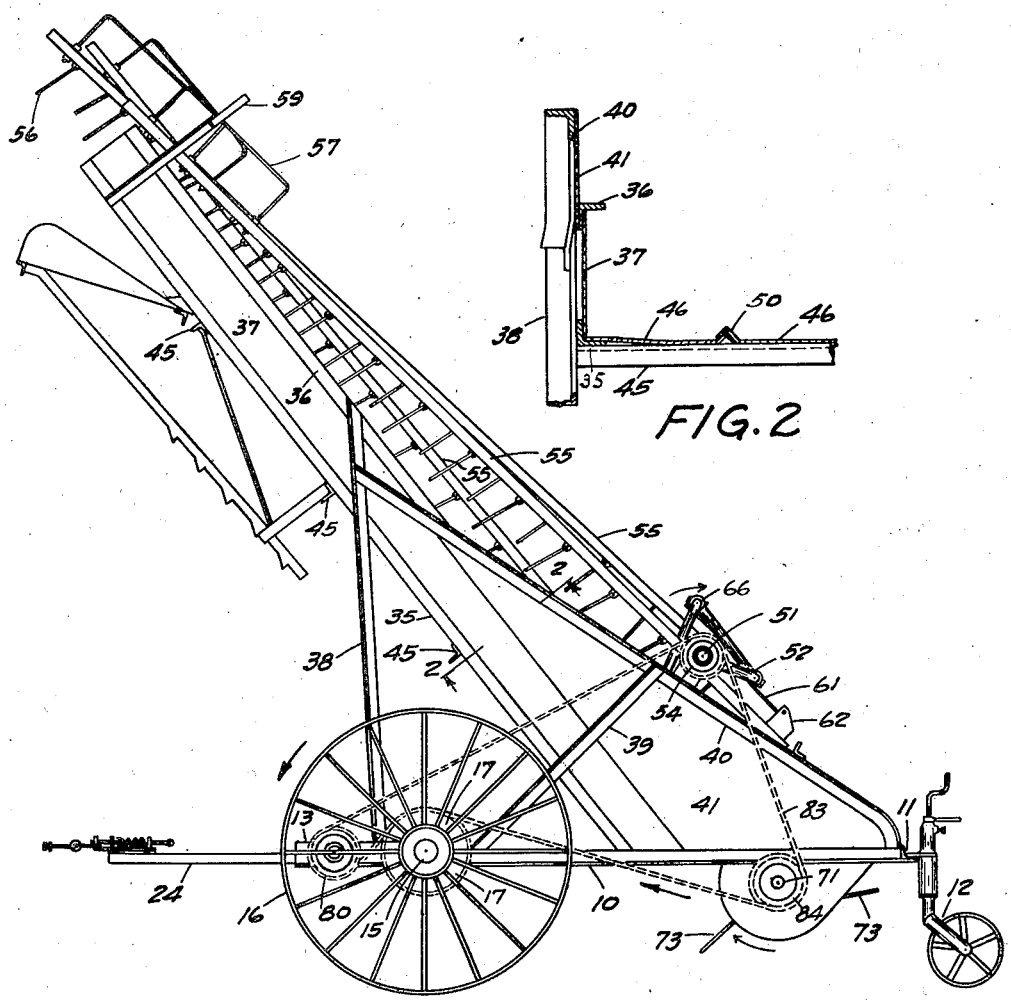
INVENTOR
Charles E. Everett
BY A.S. Krotz
ATTORNEY June 30, 1936. C. E. EVERETT 2,045,763
HAY LOADER
Filed Oct. 25, 1935 4 Sheets-Sheet 3

INVENTOR
Charles E. Everett
BY A.S.Krotz
ATTORNEY

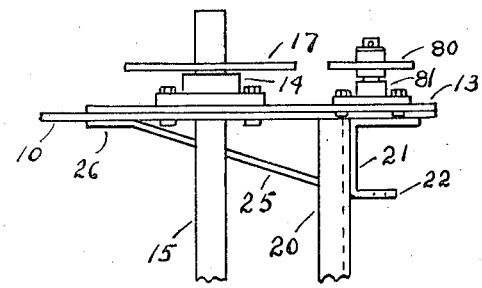
FIG. 7.
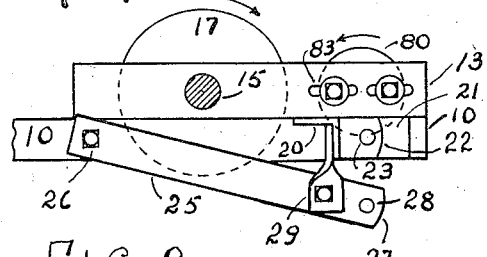
FIG. 8.
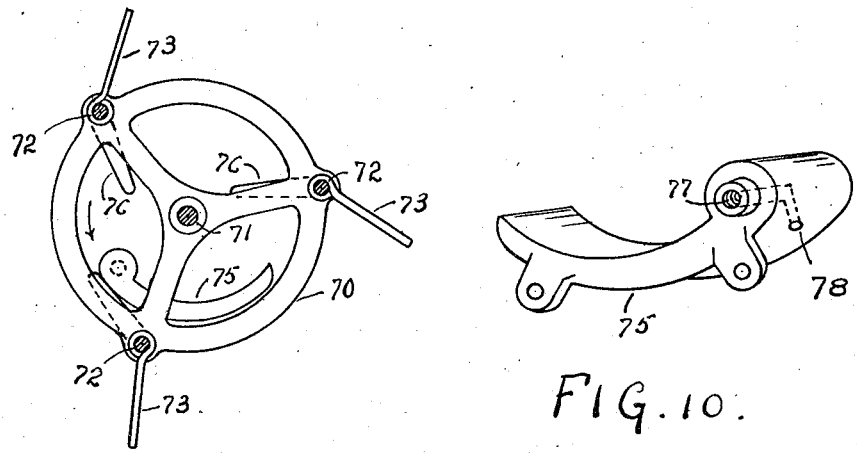
FIG. 9.
FIG. 10.
Inventor
Charles E. Everett
By A.S. Krotz
attorney Patented June 30, 1936

2,045,763

UNITED STATES PATENT OFFICE 2,045,763

HAY LOADER

Charles E. Everett, Racine, Wis., assignor to The Massey-Harris Company, Racine, Wis., a corporation of Maryland Application October 25, 1935, Serial No. 46,658

5 Claims. (Cl. 56—363)

My invention relates to the cylinder pick-up and rake bar type of hay loaders and has for its object a simple, strong, light, easily manufactured and easily operated device.

Some of the objects of this invention being to provide a simple and strong main frame having a simple and adjustable hitch, a simple, easily adjusted rear carrying means, a simple and easily adjusted chain driving device and an effective means to lubricate the cams of the pick-up cylinder.

The principal object of this invention is to provide simple and effective means whereby the rake bars may, individually, yieldingly contact an excessive amount of material, thus to avoid subjecting the device to excessive strains.

A further object being to provide a chute having reenforcing ridges on its bottom, whereby to cause the material to move parallel to the chute and be held slightly above the bottom.

To these and other useful ends this invention consists of parts and combinations of parts as described and claimed and shown in the accompanying drawings in which:

Figure 1 is a side elevation of my improved hay loader.

Figure 2 is a fractional section of the chute taken on line 2—2 of Figure 1.

Figure 7 is an enlarged fractional top view of the front of the frame.

Figure 8 is an enlarged fractional side view of the front of the frame as shown in Figure 7.

Figure 9 is a sectional view of the pick-up cylinder showing the cam movement which operates the cylinder teeth, taken on line 9—9 of Figure 3.

Figure 10 is an enlarged perspective view of the pick-up cylinder cam illustrating the threaded opening for the lubricating fitting and the outlet therefor.

Figure 3:
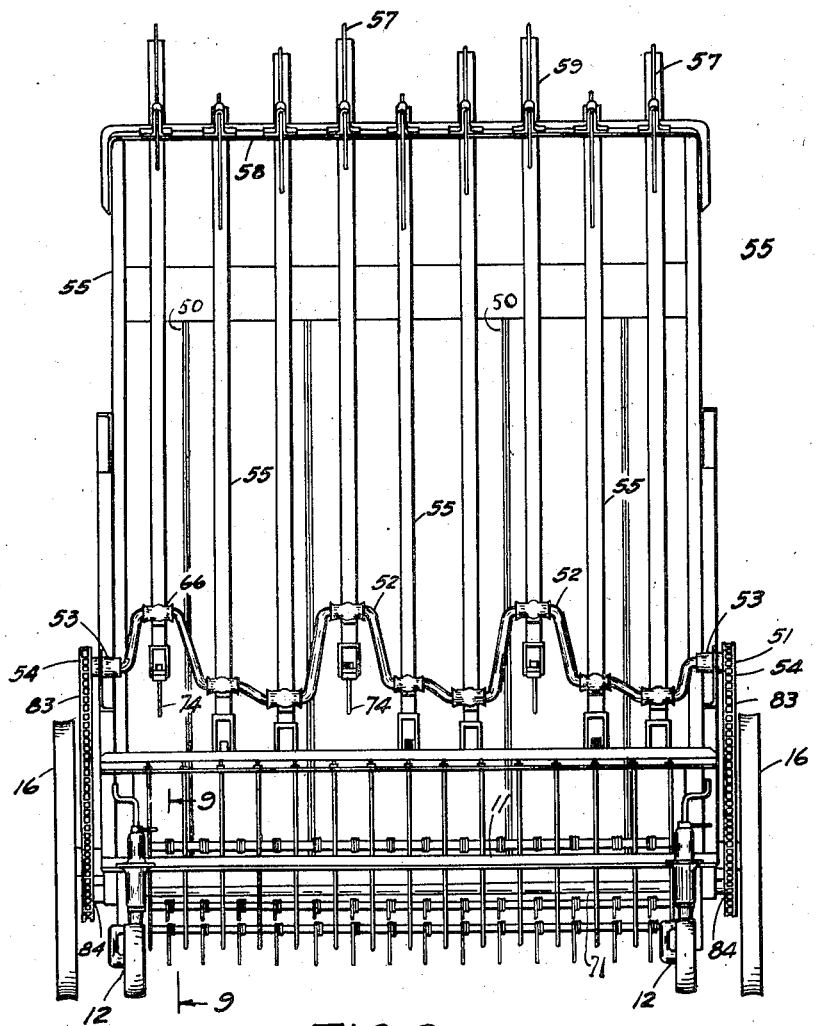
Figure 3 is a rear elevation of the device as shown in Figure 1.
Figure 4:
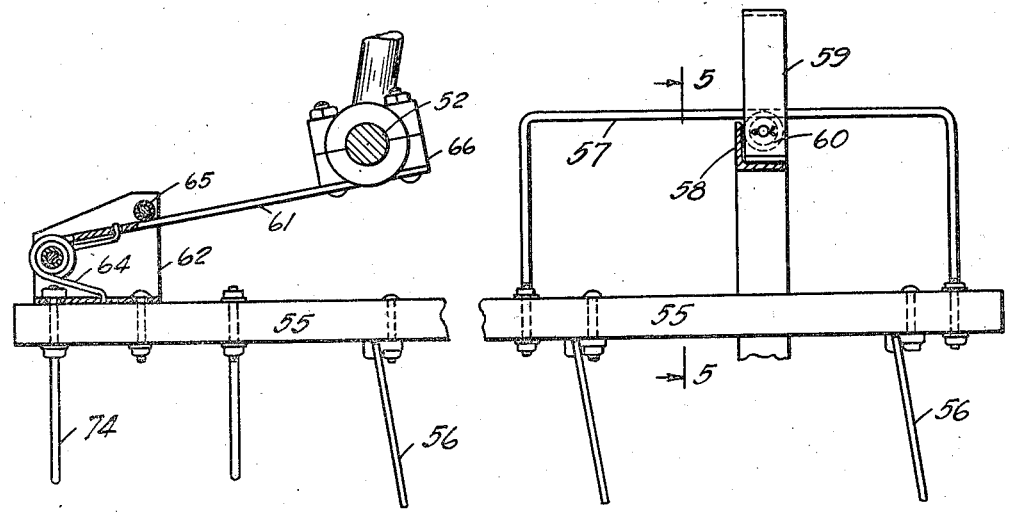
Figure 4 is an enlarged fractional side view of the rake bar illustrating its upper end supporting means and its rear end connection to the operating crank, the latter being shown in section on lines 4—4 of Figure 6.
Figure 6:
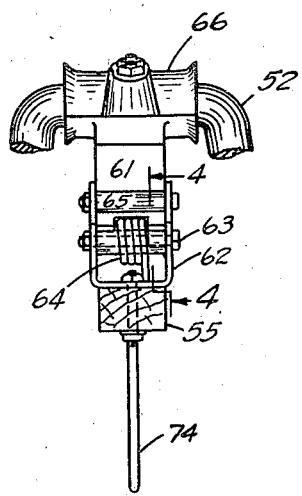
Figure 6 is a rear end view of the rake bar and its connection to the crank.
Figure 5:
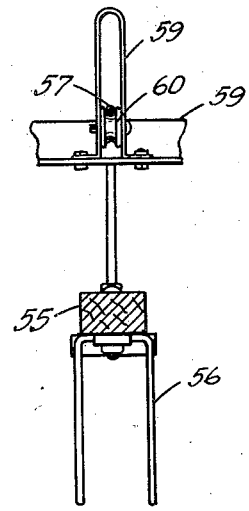
Figure 5 is a sectional view of the rake bar taken on line 5—5 of Figure 4.

As thus illustrated in the various figures, the main frame comprises side members 10, having suitable transverse braces, the rear one of which is designated by numeral 11, near the ends of which I mount rear wheeled carrying means which are designated in their entirety by numerals 12—12. These members 12 comprise suitable wheels mounted on caster axles having means whereby the frame may be easily adjusted to different distances from the ground as is clearly illustrated in Figure 1.

On the front end of members 10 I secure plates 13 to which I attach brackets 14 through which the axle shaft 15 extends, the ends projecting far enough to answer as a spindle for carrying wheels 16—16. These wheels are connected to the sprockets 17—17 through ratchet hubs, thus to provide driving means for the operating devices, as will hereinafter appear and means whereby the loader may be turned without slipping the wheels.

I provide a front cross frame member 20 (see Figures 7 and 8) suitably anchored at each end to members 10 by means of L irons 21, each having at their inner ends, a forwardly projecting portion 22, having orifices as at 23 whereby the hitch frame, which in its entirety is designated by numeral 24, may be suitably secured by means of linch pins or bolts.

In devices of the class the hitch 24 terminates at its front in a single central hitching clevis with which to attach the loader to the wagon. The height of this hitching point on the wagon may vary considerably in distance from the ground and for other reasons a lower hitch on the loader may be desirable. I provide means whereby this may be accomplished as follows:

Brace bars 25 are, at their rear ends, attached to members 10 a distance in rear of cross member 20 as at 26. These bars extend downwardly and forwardly as indicated in Figures 7 and 8, the forward ends terminating directly below members 22 as at 27, having orifices 28 which correspond to orifices 23. I provide braces 29 each secured to member 20 and members 25; thus I provide a frame brace at the two front corners and two hitching points for the rear end of hitch frame 24.

Devices of the class having a carrying wheel at each corner of the frame, must necessarily be capable of considerable distortion to successfully pass over uneven ground. It is therefore necessary to provide a frame having well braced corners and joints where the parts are secured together and thus prevent loosening the joints when the frame is distorted and it is particularly necessary for the same reason to brace the frame as at 25, to prevent racking the frame joints horizontally. Therefore in addition to a braced main frame, I provide an inclined elevator chute which acts to securely tie the side members of the frame together but permits the necessary flexing.

I provide inclined angle bars 35 and 36 having sheet metal filler strips 37 therebetween, the free lips of these bars being turned in, their flat surfaces being secured to bars 10 and posts 38 and 39, as indicated. I provide angle braces 40 which are secured to frame members 10 and posts 38 and 39 as indicated. I also provide sheet metal side plates 41. Thus suitable side walls are provided for the inclined chute and the rear end of the frame.

Suitable angle bars 45 tie the bottom bars of the chute together, providing a supporting means for the chute bottom, which comprises a number of sheet metal strips 46 positioned, as clearly illustrated in Figure 2. Their adjacent edges being tied together by inverted V shape edges 50, thus to prevent sagging between supports and provide spaced apart ridges which will tend to prevent the material from slipping sidewise on hill sides and partially hold the material away from the bottom surface thus to cause the rake prongs to more definitely penetrate the material being loaded.

I provide a transverse shaft 51 having a number of suitably positioned cranks 52, the ends of the shaft protruding through bearings 53 and each end having a sprocket 54 secured thereto. I provide a number of rake bars 55 having a number of spaced apart depending prongs 56. The upper ends of these bars are provided with rods 57. A transverse bar 58 is provided with loops 59 having pulleys 60 on which rods 57 rest, supporting the front end of bars 55 whereby the ends of prongs 56 will be held a pre-determined distance from the chute bottom but will permit the bar to rise when an excessive bulk of material is encountered.

The lower ends of bars 55 are secured to their respective cranks by means of plates or links 61, the rear ends being pivotally supported to bracket 62 by means of bolt 63. A coil spring 64 engages the bracket and link to force the free end of link 61 outwardly against the stop 65. The crank bearing 66 is secured to the free end of link 61, as indicated. Thus it will be seen that bars 55 will be oscillated at their upper ends and turn crank-like at their rear ends. Shaft 51, as will hereinafter appear, is caused to turn in the opposite direction to the ground wheels thus the rear end of bars 55 will move downward and upward toward the delivery end of the chute and the prongs 56 will be caused to penetrate the hay or material in the chute and move it along toward the delivery end of the chute. The cranks are positioned around the axis whereby there will be a continuous movement of the material.

If an unusually large bundle of material is delivered to the chute the link will act to limit the downward movement of the rear end of bars 55, thus to avoid excessive strain on the operating parts of the device. The spring 64 may be of any suitable tension or dispensed with entirely, whereby the weight of the bar only, will act to contact the material. Obviously under normal operations the bars will operate the same as if the crank bearings were attached direct to the bars.

One of the novel features of applicant's device is the manner of lubricating the pick-up cylinder cams 75. I provide a pick-up cylinder 70 which in its entirety is very similar to other devices, having a shaft 71 rotatably mounted on the rear end of the frame in rear of the lower end of the chute. This cylinder 70 carries, preferably, three prong shafts 72, the prongs 73 being closely spaced on the shaft. The ends of the prongs are moved forward close to the ground surface and deliver the hay to the entrance end of the chute where the downward and forward moving rear prongs 74 engage the hay and move it to the chute. The prongs 73 are moved to a forward position at the proper time by means of the cam 75 and pawls 76 which hold them in this position until the hay is brought to a point where it is engaged by the prongs 74, at which point the pawl 76 is released by the cam 75. Thus the prongs may assume a rearward position so as to release the material.

Pick-up pawls, cylinders and cams are a source of considerable trouble because of wear and friction. I provide novel means for lubricating these parts in the following manner: A threaded opening 77 leads to outlet opening 78, as indicated in Figure 10, thus a lubricating fitting may be supplied. A convenient means is thus provided for lubricating these parts.

I provide simple and novel means for driving the crank shaft and pick-up cylinder in the following manner: Idler sprockets 80 are rotatably mounted on brackets 81, which are secured to plates 13 by means of suitable bolts. Suitable slots 82 provide means for securing the brackets 81 in the desired position. Chains 83 pass directly from the top of sprockets 17 to the under side of sprockets 84, thence over the top of sprockets 54 and from there to sprockets 80, as indicated. Thus the pick-up cylinder and crank shaft will turn in the opposite direction to the driving wheels. Sprockets 80 are positioned close to sprockets 17, thus to engage a considerable number of teeth. The chain may be adjusted to the desired tautness by moving brackets 81 in either direction.

Thus it will be seen that applicant's hay loader is light, simple and will operate efficiently; that large lumps of material may pass over the chute without undue strains and waste of power and that the device is neat in appearance. Obviously various modifications are possible without departing from the scope of the appended claims.

Having thus shown and described my invention I claim:

1. A loading device of the class described, having an inclined elevator frame forming a chute, a number of transversely spaced bars positioned over said chute having at their upper ends guiding and supporting means, a transverse shaft having a number of variously positioned cranks to which the lower ends of said bars are operatively connected, whereby said bars reciprocate at their upper ends and move crank-like at their lower ends, means whereby the material is penetrated and moved upwardly in said chute, said operating connections comprising links having hinged connections at their rear ends to the rear ends of their respective bars and connections at their front ends to their respective cranks, having stops near said hinges whereby said bars are held from moving past a predetermined point from said cranks, springs at said hinges adapted to yieldingly permit said bars to approach said cranks and thereby yieldingly contact the material being loaded.

2. A loading device of the class described, having an inclined elevator frame forming a chute, a number of transversely spaced bars positioned over said chute having at their upper ends guiding and supporting means, a transverse shaft having a number of variously positioned cranks to which the lower ends of said bars are operatively connected, whereby said bars reciprocate at their upper ends and move crank-like at their lower ends, means on said bars whereby the material is penetrated and moved upwardly in said chute, said operating connections comprising links having hinged connections at one end to said bars and the other ends having connections to their respective crank bearings, stops near said hinges; whereby said bars will drop by gravity, a predetermined distance from said cranks, but will be permitted to approach said crank when in contact with excessive material being loaded.

3. A loading device of the class described, comprising a main frame having an inclined elevator chute rigidly attached thereto, two forward carrying and driving wheels and two rear carrying wheels, a transverse frame member at the forward end of said frame having hitching connections attached thereto a short distance from said side members, braces attached to said side members a short distance in rear of said transverse member and extending forwardly, terminating into hitching connections a distance below said first named hitching connections, vertical members rigidly connecting said braces to said transverse frame member, a hitching frame adapted to be attached to said first or second mentioned hitching connections, a number of instrumentalities operatively connected to said driving wheels whereby hay or other material will be picked up and elevated over said chute.

4. A loader of the class described, comprising a horizontal frame having an inclined chute rigidly attached thereto, front carrying and driving wheels and rear carrying wheels for said frame, a pick-up cylinder in rear of said chute, a shaft positioned over the rear end of said chute and having a number of variously positioned cranks, a number of rake bars having their rear ends operatively connected to said cranks, the upper ends of said bars being slidably supported, said front carrying wheels having operative connections to said shaft and pick-up cylinder thereby to be turned in opposite direction to said carrying wheels whereby the upper ends of said bars will oscillate and the lower ends will be moved crank-like, a number of spaced apart contact prongs on the lower surface of said bars, a number of spaced apart transverse frame members rigidly connecting the lower side members of said chute and adapted to carry the bottom of said chute, said bottom comprising a number of sheet metal strips being joined together by means of interlocking inverted V shaped edges forming ridges whereby the material will be moved parallel thereto and held above the bottom of the chute and is more definitely penetrated by said prongs.

5. A loading device of the class described, comprising a main frame having an inclined elevator chute, front and rear carrying wheels therefor, a transverse shaft having a number of cranks positioned above said chute and adjacent the rear end thereof, a number of rake bars having depending prongs, the upper ends having slidably supporting means positioned to hold said prongs a predetermined distance from the bottom of said chute but permit yielding contact on an excessive bulk of material, the lower end of said bars each having a yielding connection to one of said cranks, whereby an excessive amount of material in said chute may reduce the downward movement of said bars, a pick-up cylinder in rear of said chute, operating connections to said front carrying wheels whereby said pick-up cylinder and shaft will be turned in opposite direction thereto, said chute bottom having a number of spaced apart inverted V shaped ridges parallel to said bars whereby the moving material will tend to travel parallel to said chute and be held slightly above the bottom thereof.

CHARLES E. EVERETT.